United States Patent [19]

Christen et al.

[11] Patent Number: 5,369,996

[45] Date of Patent: Dec. 6, 1994

[54] PHYSICAL MAGNITUDE MEASUREMENT SENSOR

[75] Inventors: Michel Christen, Cormondrèche; Raymond Froidevaux, Boudry, both of Switzerland

[73] Assignee: Asulab S.A., Bienne, Switzerland

[21] Appl. No.: 958,728

[22] Filed: Oct. 9, 1992

[30] Foreign Application Priority Data

Oct. 21, 1991 [FR] France .................. 91 13067

[51] Int. Cl.[5] .................................. G01P 15/08
[52] U.S. Cl. .................................. 73/517 AV
[58] Field of Search ............ 73/517 AV, 517 R

[56] References Cited

U.S. PATENT DOCUMENTS

| | | | |
|---|---|---|---|
| 2,966,617 | 12/1960 | Hardway, Jr. | 73/516 R |
| 3,035,450 | 5/1962 | Hardaway | 73/492 |
| 3,897,690 | 8/1975 | Hanson | 73/517 B |
| 4,149,422 | 4/1979 | Olsen | 73/DIG. 1 |
| 4,221,131 | 9/1980 | Albert | 73/517 AV |
| 4,515,016 | 5/1985 | Hartemann et al. | 73/517 R |

FOREIGN PATENT DOCUMENTS 2490828 9/1981 France .
2234817 2/1991 United Kingdom .

Primary Examiner—Hezron E. Williams
Assistant Examiner—Christine K. Oda
Attorney, Agent, or Firm—Pollock, Vande Sande & Priddy

[57] ABSTRACT

A measurement sensor 1 for sensing a physical magnitude and comprising a framework 2, a seismic mass 36 displaceable relative to the framework, and a support frame 8 for the mass 36. The support frame 8 is fixed to the framework and elastically deformable along a sensing axis $X_S$ by the physical magnitude. A transducer 20 is fixed to the support frame 8 for supplying a signal representative of the physical magnitude in response to a deformation of the support frame 8. An arrangement 50, 52, 54, 56 protects the transducer 20 against a force exhibiting at least one component in a plane substantially perpendicular to the sensing axis $X_S$. The arrangement permits a reversible displacement of the mass 36 relative to the support frame 8 in the perpendicular plane during a shock without acting upon the transducer 20, and a positioning of the mass 36 relative to the support frame 8 in the absence of the shock.

20 Claims, 2 Drawing Sheets

PHYSICAL MAGNITUDE MEASUREMENT SENSOR

This invention concerns physical magnitude measurement sensors which include an elastically deformable support provided with detection means sensitive to a force, for example to an acceleration.

BACKGROUND OF THE INVENTION

In the most elementary form such sensors comprise a deformable support having the general form of a beam of rectangular cross-section secured in cantilever to a framework. Such deformable support which is provided so as to flex along a so-called sensing axis includes, on the one hand, a quartz resonator which forms detection means and which is directly fastened thereto in a mid-zone. On the other hand, the support includes a seismic mass fixed to the end opposite to that by which it is secured to the framework. Thus, under the action of a force such as an acceleration, the mass is displaced and deforms the support and the resonator coupled thereto. Such deformation brings about a variation in the vibration of the resonator which constitutes a signal representative of the magnitude of the applied force. Such signal is thereafter processed by an appropriate electronic circuit.

More specifically, this invention concerns such sensors comprising furthermore protection means intended to protect said detection means against accidental shocks capable of producing forces which present a component perpendicular to the sensing axis.

It is known in effect that sensors of this type are delicate precision measuring instruments, the detection means of which may be easily damaged because of their extreme fragility. Such damage occurs most often during manipulation of the sensor at the moment of its assembly for instance on a vehicle or during its replacement, indeed during examinations for checking the operation thereof. Such damage comes about in particular when the detection means undergo forces which are not parallel to their sensing axis. This is the case when, for instance, the mass undergoes an acceleration along the longitudinal axis of the support and the detection means are formed by a quartz resonator adapted for bending strain. Effectively, such an acceleration provokes an unforeseen traction on the detection means for which they are not adapted in a manner that they rapidly reach their breaking point and fail.

Such a deterioration of the detection means is undesirable and may have serious consequences since it is invisible from the outside and such sensors are generally intended to equip automotive vehicles or any other passenger transport machines in which they are supposed to furnish information having a direct incidence on the behaviour of essential elements of the vehicle and consequently on the security of the passengers.

There is known, in particular from patent document FR-A-2 490 828, a sensor forming an accelerometer comprising a structure protecting against shocks. According to this document, the case of the accelerometer is coated with a silicone rubber intended to absorb eventual accidental shocks.

Although such coating absorbs and dampens a portion of the shocks, it does not avoid transmission of acceleration beyond a certain threshold and thus does not constitute a particularly reliable protection system for the detection means. Furthermore, the case of such accelerometer may not be disassembled without ruining the protection layer so that servicing such accelerometer is a long and expensive operation.

Thus, the present invention has as purpose to overcome the disadvantages of the above-mentioned prior art by providing a measuring sensor equipped with protecting means for its detecting means, such protecting means being of simple construction and being effective whatever be the intensity level of a shock received by the sensor or of an acceleration for which a component is located out of the sensing axis of the sensor.

SUMMARY OF THE INVENTION

To this end, the invention has as objective a measurement sensor for a physical magnitude of the type which comprises:
a framework,
a seismic mass capable of being displaced relative to the framework,
support means for the mass, such being fixed to the framework and elastically deformable along a sensing axis under the action of the physical magnitude,
detecting means fixed to the support means, such detecting means being adapted to supply a signal representative of the physical magnitude in response to a deformation, and
means for protecting the detecting means against a force having a component located in a plane substantially perpendicular to the sensing axis.

In conformity with the invention, such sensor is characterized in that the protecting means are adapted to permit during application of said force a reversible displacement of the mass relative to the support means in said plane and a positioning of the mass relative to said support means in the absence of said force.

Thus, when the sensor undergoes a force such as an acceleration, a component of which is located outside its sensing axis, for example during a shock, the seismic mass is disconnected from the support means so that the detection means do not undergo any stress and no energy capable of causing breakage thereof is transmitted thereto.

According to an advantageous characteristic of the invention, the protecting means comprise return means permitting the mass to be translated in a reversible manner in a plane perpendicular to the sensing axis.

It may also be specified that the protecting means comprise abutment means limiting the displacement of the mass in the plane perpendicular to the sensing axis.

Other characteristics and advantages of the present invention will appear in the light of the detailed description which follows of an embodiment of the invention, given by way of non-limiting example, in connection with the attached drawings.

DESCRIPTION OF THE PREFERRED EMBODIMENT

Figure 1:
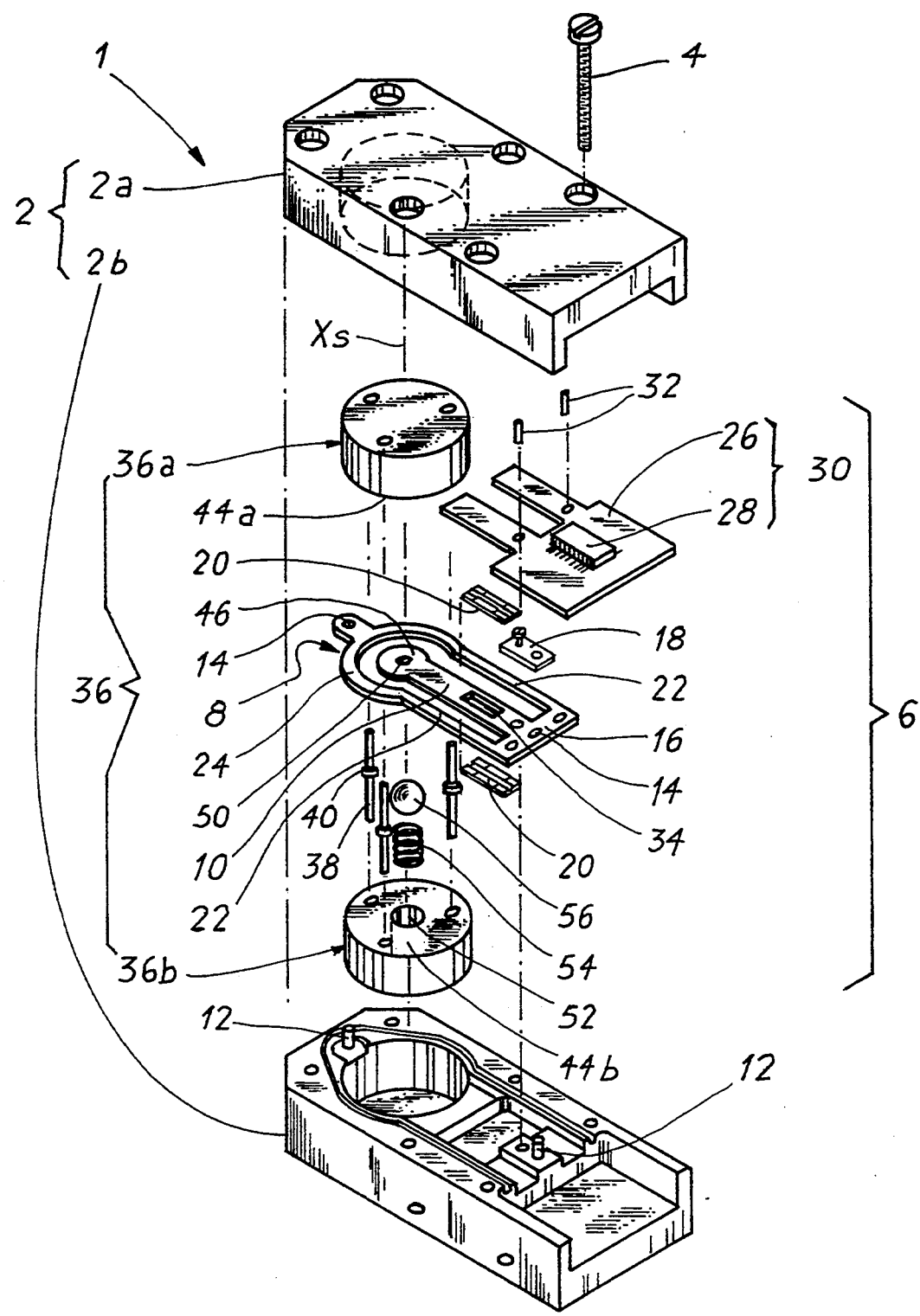
FIG. 1 is an exploded perspective view of a measuring sensor according to the invention showing the elements of the protecting arrangement of the detection means.

Referring initially to FIG. 1, there will be seen a preferred embodiment of the measurement sensor according to the invention designated by the general reference number 1.

Such sensor 1 includes a framework 2 which is formed from two shells respectively 2a and 2b of similar form and destined to be assembled by fastening means, such as screws a single one of which, referenced 4, has been shown on FIG. 1.

Framework 2 is adapted to accommodate a functional unit 6 which comprises support means 8 a portion 10 of which is elastically deformable under the action of a physical magnitude to be measured.

Support means 8 are attached to framework 2 and are fixedly positioned on the latter through two pins 12 engaged in holes, not shown, provided respectively in the shells 2a and 2b of framework 2. Such pins 12 cooperate with orifices 14 provided in support means 8.

In this specific example, the support means 8 include a base 16 which is intended to be mechanically secured onto framework 2 through a clamp 18.

Starting from base 16 there extends in cantilever an element 10 of generally elongated form which is particularly adapted to be deformed elastically relative to base 16. Such elongated element 10 takes the form of a beam of rectangular cross-section. Such beam 10 is provided so as to flex in a direction perpendicular to its major surfaces under the action of an exterior force, along a sensing axis $X_s$ in order to stress the detecting means 20 which will be described in further detail hereinafter.

In this embodiment, the support means 8 include two arms 22 coupled together so as to form a closed framework surrounding the elongated element 10.

The two arms 22 extend in a coplanar manner in a direction substantially parallel to that of the elongated element 10 from base 16 substantially to the free end thereof. The two arms 22 are thereafter connected together through a joining portion 24 having the general form of a horse shoe. One of the positioning holes 14 is provided in the joining portion 24 of the support means 8, while the other is provided in base 16.

The functional unit 6 also includes two detection means 20 made up from two quartz resonators in the form of a double tuning fork mounted on either side of the elongated element 10 and in its mid-zone. Each resonator 20 is electrically coupled to an associated printed circuit plate 26 on which are assembled electronic components 28 a single one of which has been shown on the drawing. Elements 26 and 28 constitute an electronic circuit 30.

It will be seen on one hand that the printed circuit plate 26 is secured onto support means 8 through studs 32 driven into base 16 and on the other hand that at the place where resonators 20 are mounted the elongated element 10 includes, under each resonator 20, a traversing opening 34 enabling resonators 20 to vibrate freely.

In a known manner, resonators 20 are connected to oscillating circuits, not shown, the resonant frequencies of which vary as a function of the deformation of the resonators and consequently as a function of the deformation of element 10. The resonant circuits furnish signals which are processed and analyzed in the electronic circuit 30. The latter furnishes a signal which varies as a function of the deformation of the element 10. In this example a seismic mass 36 is secured to the free end of element 10 and is adapted to be displaced relative to the framework when sensor 1 undergoes an acceleration.

Figure 2:
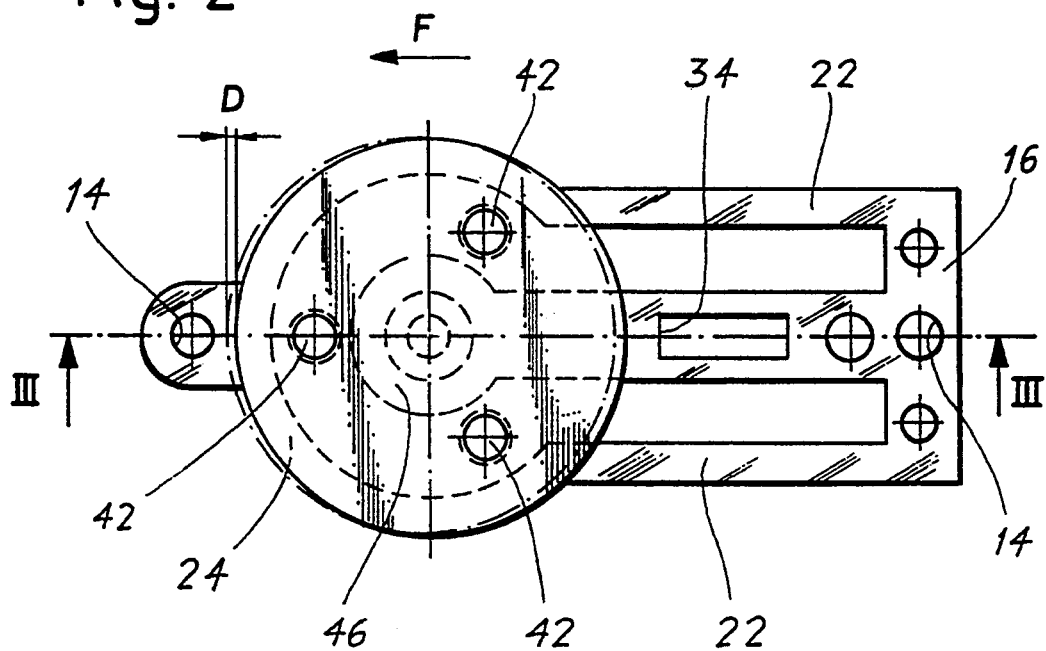
FIG. 2 is a view from above of the support of the sensor of FIG. 1 equipped with a seismic mass associated with means for protecting the detecting means of the sensor according to the invention, the seismic mass being shown in full lines in a first position corresponding to its normal operating position and in broken lines in a second position corresponding to a position referred to as the displaced position after having undergone and absorbed a shock.
Figure 3:
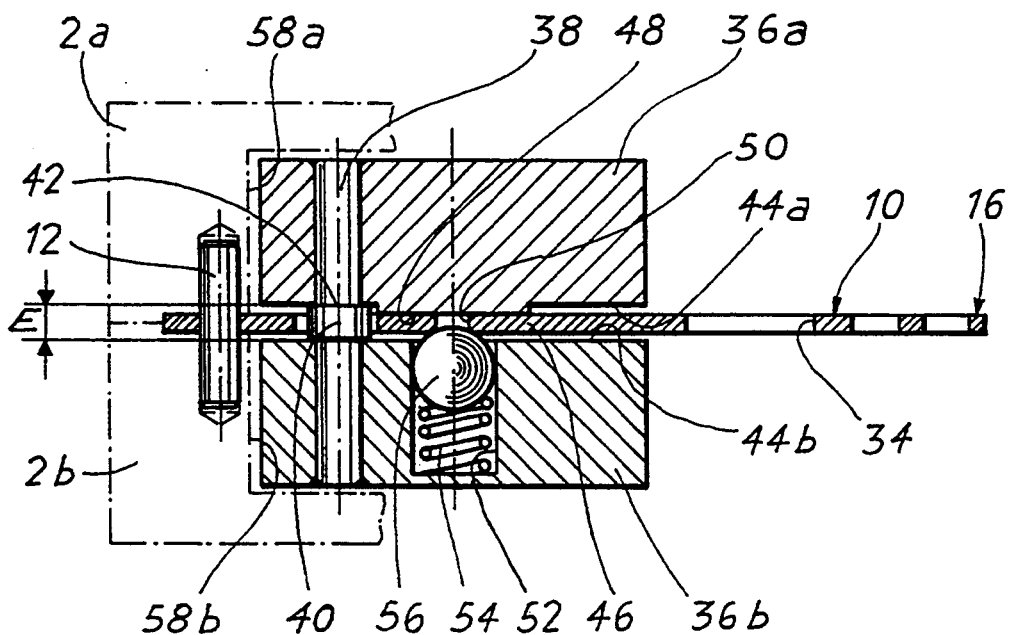
FIG. 3 is a longitudinal cross-section taken along line III—III of FIG. 2 and in which there has been shown in broken lines a portion of the framework of the sensor according to the invention associated with positioning means of such support on the framework.

By referring henceforth also to FIGS. 2 and 3, it will be seen that mass 36 comprises two half-masses 36a and 36b each extending respectively on one and the other side of the support means 8 and which are coupled to one another by means of three pins 38. Such pins 38 are regularly distributed in masses 36a and 36b and are angularly separated relative to one another by an angle of about 120°. Each includes in its mid portion a collar 40 which forms two shoulders 42 on which bear directly facing surfaces 44a, 44b of the two half-masses 36a and 36b. Collar 40 forms by its width a spacer which defines a free space E between the two half-masses 36a and 36b. Beam 10 as well as the horse shoe-formed portion 24 of the support means 8 extends partially into space E. The recess left between beam 10, the framework formed by the two arms 22 and the horse shoe-formed portion 24 forms a passage in which extend the collars 40 with clearance.

It will be furthermore noted and in particular on FIGS. 1 and 2 that the free end of beam 10 includes a widened portion 46 on which rests directly a portion 48 of the surface 44a of half-mass 36a.

Additionally, such portion 46 includes at its center an orifice 50 opening out at least in a direction opposite to portion 48 and in particular facing surface 44b of the other half-mass 36b.

In the interior of half-mass 36b is provided a blind housing 52 which opens out facing orifice 50 provided in portion 46 of beam 10.

Housing 52 contains a helical compression spring 54 which rests supported on the bottom of the blind housing 52 and which urges a ball 56 also housed at least partially in housing 52. The ball 56 is thus interposed between element 10, more particularly, portion 46 of this latter and an end of spring 54.

It will also be noted in particular on FIG. 3 that spring 54 forms return means which act on ball 56 partially housed in orifice 50.

Furthermore, the penetration of the ball 56 in orifice 50 under the effect of the urging of spring 54 forms positioning means for the seismic mass 36 relative to the support means 8 and thereon and more particularly on beam 10.

The operation of the measurement sensor according to the invention is as follows:

In normal operation, such as is shown in full lines on FIGS. 2 and 3, the seismic mass is maintained fixed to the beam 10 and thus support means 8 through the positioning means formed by ball 56, spring 54 and orifice 50. In this configuration, when the measurement sensor according to the invention undergoes a stress along its sensing axis $X_s$, mass 36 is always displaced along such sensing axis $X_s$ relative to framework 2 which subsequently deforms beam 10 and in turn resonators 20 which generate a signal representative of the received force.

It may be specified that the above-mentioned displacement of mass 36 is damped thanks to the arrangement of two cavities 58a and 58b respectively provided in the two shells 2a, 2b of framework 2.

When the seismic mass 36 undergoes a force comprising a component located outside the sensing axis $X_s$ and in particular an acceleration resulting from shocks for which the essential component extends in a plane substantially perpendicular to the sensing axis $X_s$, seismic mass 36 undergoes a force F tending to displace it in the sense of such force in a plane perpendicular to the sensing axis $X_s$ according to a translation motion along beam 10 as illustrated by a displacement D in FIG. 2.

The displacement D in translation of the seismic mass then tends to compress spring 54 through the connection between ball 56 and orifice 50. Such compression of spring 54 displaces ball 56 in a direction parallel to the sensing axis $X_s$ causing the latter to be at least partially retracted into blind housing 52 so that the seismic mass 36 is disconnected from beam 10 and is brought to bear against the cylindrical wall of the damping cavities 58a and 58b which form the abutment means. Thus, the energy received by the seismic mass 36 because of the external force during the shock is transformed to kinetic energy which is in turn transmitted to framework 2 which absorbs it without damaging consequences for beam 10 and the sensitive elements which it includes.

When the shock has ceased, the clearance provided between the outer periphery of the seismic mass 36 and the cylindrical wall of the damping cavities 58a and 58b permits the summit of ball 56 situated in orifice 50 not to go past the peripheral edge of such cavity so that it is brought back under the action of the compression spring 54 towards and to the interior of orifice 50.

This arrangement forms return means permitting mass 36 to be translated in a reversible manner and in particular to return to its operational position after having undergone a shock.

It will be understood thus that the measurement sensor according to the invention includes protecting means capable of permitting during a shock a reversible displacement of the seismic mass 36 relative to the support means 8 and in particular relative to beam 10 in the plane normal to the sensing axis $X_s$ as well as a positioning of the mass in the absence of shock.

What we claim is:

1. A measurement sensor for a physical magnitude comprising a framework; a seismic mass displaceable relative to the framework along a sensing axis; support means for the mass, said support means being fixed to the framework and elastically deformable upon a displacement of the mass along said sensing axis by the physical magnitude; detecting means fixed to the support means for supplying a signal representative of the physical magnitude in response to a deformation of said support means; and protecting means for protecting the detecting means against a force exhibiting at least one component located in a plane perpendicular to said sensing axis, said protecting means permitting a reversible displacement of the mass relative to said support means in said perpendicular plane during a shock without acting upon said detecting means and a positioning of the mass relative to said support means in the absence of said shock.

2. The measurement sensor as set forth in claim 1 in which the protecting means comprises return means for enabling reversible translation of the mass in the plane perpendicular to the sensing axis.

3. The measurement sensor as set forth in claim 2, wherein said protecting means further comprises positioning means cooperating with said return means.

4. The measurement sensor as set forth in claim 3 wherein said return means comprises a spring acting on a ball partially housed in an orifice.

5. The measurement sensor as set forth in claim 4 wherein the orifice is formed in the support means, and the spring and the ball are housed in the mass.

6. The measurement sensor as set forth in claim 5 wherein the ball is interposed between the support means and the spring.

7. The measurement sensor as set forth in claim 6 wherein the support means comprises a base from which extends a cantilevered elongated element, and two arms coupled together to form a closed framework around said elongated element, said detecting means being affixed to said elongated element.

8. The measurement sensor as set forth in claim 7 wherein the elongated element includes an enlarged free end in which said orifice is formed.

9. The measurement sensor as set forth in claim 2 wherein said return means comprises a spring acting on a ball partially housed in an orifice.

10. The measurement sensor as set forth in claim 9 wherein the orifice is formed in the support means, and the spring and the ball are housed in the mass.

11. The measurement sensor as set forth in claim 10 wherein the ball is interposed between the support means and the spring.

12. The measurement sensor as set forth in claim 11 wherein the support means comprises a base from which extends a cantilevered elongated element, and two arms coupled together to form a closed framework around said elongated element, said detecting means being affixed to said elongated element.

13. The measurement sensor as set forth in claim 12 wherein the elongated element includes an enlarged free end in which said orifice is formed.

14. The measurement sensor as set forth in claim 2 wherein the support means comprises a base from which extends a cantilevered elongated element, and two arms coupled together to form a closed framework around said elongated element, said detecting means being affixed to said elongated element.

15. The measurement sensor as set forth in claim 1 in which the protecting means comprises abutment means for limiting the displacement of the mass in the plane perpendicular to the sensing axis.

16. The measurement sensor as set forth in claim 15 wherein the framework comprises damping cavities which have interior walls and in which the mass is suspended, the abutment means being formed by said interior walls of said cavities.

17. The measurement sensor as set forth in claim 1 wherein the support means comprises a base from which extends a cantilevered elongated element, and two arms coupled together to form a closed framework around said elongated element, said detecting means being affixed to said elongated element.

18. The measurement sensor as set forth in claim 17 wherein the elongated element includes an enlarged free end in which an orifice is formed.

19. The measurement sensor as set forth in claim 1 wherein the seismic mass comprises two half masses connected together, each half mass extending respectively on one and the other side of the support means.

20. The measurement sensor as set forth in claim 1 further comprising means for limiting said displacement of the mass along said sensing axis.

* * * * *